United States Patent Office 2,803,640
Patented Aug. 20, 1957

2,803,640

α-CYANOVINYL-SUBSTITUTED ARYL AMINES AND THEIR PREPARATION

Richard E. Heckert, Richmond, Va., assignor to E. I. du Pont de Nemours and Company, Wilmington, Del., a corporation of Delaware No Drawing. Application November 12, 1954, Serial No. 468,570

5 Claims. (Cl. 260—465)

This invention relates to a new class of dyes, more particularly a new class of amino substituted dyes, and to a process for their preparation.

It is highly desirable for commercial purposes to have available within a given chemical type a full range of colors so that a single chemical procedure can be adapted for applying a full color range of dyes. In such an effort it frequently occurs that dyes which absorb light of shorter wavelengths (yellow and orange dyes) are much more readily obtained than those which absorb light of longer wave lengths (blue and violet dyes).

The present invention has as an object the preparation of a new class of dyes. A further object is the preparation of dyes characterized by maximum light absorption at wave lengths at least 40 millimicrons higher than the values for their precursors. Other objects will appear hereinafter.

These objects are accomplished by the present invention of aromatic amines having, on the aromatic ring, a polysubstituted vinyl group containing one or two cyano groups, one of which is in the position alpha to the aromatic ring, each substituent being an electron-attractive substituent containing a plural bond, i. e., a group orienting meta in nucleophilic aromatic substitution. These compounds are characterized by maximum light absorption at wave lengths at least 40 millimicrons higher than the values for their respective precursors which have hydrogen in place of the cyano group in the alpha position of the vinyl group. A further aspect of the invention is the process whereby the α-hydrogen precursors of said compounds are hydrocyanated to yield the corresponding α-cyanoethyl-substituted aromatic amines which are then oxidized to yield the corresponding aromatic amines containing on the aromatic carbocyclic ring a polysubstituted vinyl group as above.

In a preferred embodiment of this invention, a solution of a vinyl aromatic amine having hydrogen on vinyl carbon alpha to the ring, e. g., a p-(β,β,-bis[alkoxycarbonyl]vinyl)phenylamine, is treated in an organic solvent with concentrated aqueous alkali cyanide to effect the addition of hydrogen cyanide and form the corresponding p - (β,β - bis[alkoxycarbonyl] - α -cyanoethyl)-phenylamine. This intermediate compound may be isolated and purified if desired. Whether isolated or not the intermediate ethylphenylamine is acidified and dehydrogenated by the action of an oxidizing agent to yield a p-(β,β-bis[alkoxycarbonyl]-α-cyanovinyl)phenylamine.

The following examples in which parts are by weight are illustrative of the invention.

EXAMPLE I

Part A

A solution of 6,140 parts of benzyl cyanoacetate, 5,220 parts of p-dimethylaminobenzaldehyde, 100 parts of piperidine, and 300 parts of acetic acid in 35,000 parts of absolute alcohol is refluxed for 2 hours to give 9,450 parts of N,N - dimethyl - p - (β - benzyloxycarbonyl - β - cyanovinyl)phenylamine, M. P. 132–133° C. The light absorption spectrum of an acetone solution of this compound shows a maximum absorption at 423 millimicrons with a molecular extinction coefficient of 47,400.

Part B

A solution of 612 parts of N,N-dimethyl-p-(β-benzyloxycarbonyl-β-cyanovinyl)phenylamine in 4,723 parts of dimethylformamide is stirred under nitrogen at 40° C. while 600 parts of 4 N aqueous sodium cyanide solution is gradually added. After 5 minutes, 5,245 parts of acetic acid is added, followed by 886 parts of lead tetraacetate. The mixture is stirred for 5 minutes and poured with vigorous agitation into 50,000 parts of a mixture of ice and water. The precipitate which forms is separated by filtration and recrystallized from 1-propanol to give 344 parts of N,N - dimethyl - p - (β - benzyloxycarbonyl - α,β-dicyanovinyl)phenylamine,

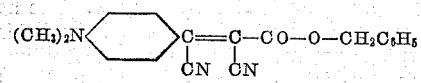

M. P. 143–144° C. The light absorption spectrum of an acetone solution of this compound shows a maximum absorption at 500 millimicrons with a molecular extinction coefficient of 31,600. This compound gives bright red dyeings on fibers of cellulose acetate, polyacrylonitrile, or polyethylene terephthalate. The washfastness is good. This compound is highly resistant to hydrolysis in weakly acidic media, particularly in the pH range of 3–6 as shown by the fact that in boiling water of pH 4 only 18% of a suspension of this material is destroyed after 23 hours.

*Analysis.*—Calculated for $C_{20}H_{17}N_3O_2$: C, 72.5%; H, 5.2%. Found: C, 72.7%; H, 5.2%.

EXAMPLE II

Part A

Cyanoacetamide is substituted for benzyl cyanoacetate in part A of Example I and there is obtained N,N-dimethyl-p-(β-carbamyl-β-cyanovinyl)phenylamine, M. P. 194–195° C. The light absorption spectrum of an acetone solution of this compound shows a maximum absorption at 403 millimicrons with a molecular extinction coefficient of 36,400.

Part B

By the process of part B in Example I, N,N-dimethyl-p-(β-carbamyl-β-cyanovinyl)phenylamine is converted to N,N - dimethyl - p - (β-carbamyl-α,β-dicyanovinyl)-phenylamine, M. P. 120–130° C. The light absorption spectrum of this compound in acetone solution shows a maximum absorption of 469 millimicrons. This compound gives pink dyeings on hydrophobic fibers.

*Analysis.*—Calculated for $C_{13}H_{12}N_4O$: C, 65.0%; H, 5.0%; N, 23.3%. Found: C, 62.6%; H, 5.1%; N, 21.8%.

EXAMPLE III

Part A

Benzoylacetonitrile is substituted for benzyl cyanoacetate in part A of Example I and there is obtained N,N - dimethyl - p-(β-benzoyl-β-cyanovinyl)phenylamine, M. P. 159–160.5° C. The light absorption spectrum of an ethanol solution of this compound shows a maximum absorption at 450 millimicrons.

Part B

By the process of part B in Example I, N,N-dimethyl-p-(β-benzoyl-β-cyanovinyl)phenylamine is converted to N,N - dimethyl - p - (β-benzoyl-α,β-dicyanovinyl)phenylamine. This latter compound without recrystallization melts at 94–102° C. The light absorption spectrum of an ethanol solution of this compound shows a maximum absorption at 493 millimicrons. It gives red-brown dyeings on hydrophobic fibers.

*Analysis.*—Calculated for $C_{19}H_{15}N_3O$: C, 75.7%; H, 5.0%; N, 14.0%. Found: C, 75.1%; H, 5.4%; N, 13.9%.

EXAMPLE IV

Part A

Methyl cyanoacetate is substituted for benzyl cyanoacetate in the procedure of part A of Example I and there is obtained N,N-dimethyl-p-(β-cyano-β-methoxycarbonylvinyl)phenylamine, M. P. 141–142° C. The light absorption spectrum of an ethanol solution of this compound shows a maximum absorption at 421 millimicrons with a molecular extinction coefficient of 42,400.

Part B

By the process of part B in Example I, N,N-dimethyl-p-(β-cyano-β-methoxycarbonylvinyl)phenylamine is converted to N,N-dimethyl-p-(α,β - dicyano - β - methoxycarbonylvinyl)phenylamine, M. P. 84–86° C. The light absorption spectrum of an ethanol solution of this compound shows a maximum absorption at 487 millimicrons.

*Analysis.*—Calculated for $C_{14}H_{13}N_3O_2$: N, 16.5%. Found: N, 16.4%.

EXAMPLE V

Part A 3-methyl-1-phenyl-5-pyrazolone is substituted for benzyl cyanoacetate in part A of Example I and there is obtained 4-(p-dimethylaminobenzylidene)-3-methyl-1 - phenyl - 5-pyrazolone, M. P. 197–198° C. The light absorption spectrum of an ethanol solution of this compound shows a maximum absorption at 460 millimicrons with a molecular extinction coefficient of 36,600.

Part B

By the process of part B in Example I, 4-(p-dimethylaminobenzylidene) - 3 - methyl - 1 - phenyl - 5 - pyrazolone is converted to 4-(α-cyano-p-dimethylaminobenzylidene)-3-methyl-1-phenyl-5-pyrazolone, M. P. 80–95° C. The light absorption spectrum of an acetone solution of this compound shows a maximum absorption at 525 millimicrons. This compound gives violet dyeings on hydrophobic fibers, e. g., "Dacron" polyester fibers.

*Analysis.*—Calculated for $C_{20}H_{18}N_4O$: C, 72.7%; H, 5.5%; N, 17.0%; mol. wt., 330. Found: C, 69.2%; H, 5.8%; N, 16.7%; mol. wt., 385.

EXAMPLE VI

Part A

Ethyl cyanoacetate is substituted for benzyl cyanoacetate and p-dimethylamino-o-methylbenzaldehyde is substituted for p-dimethylaminobenzaldehyde in the procedure of part A of Example I, and there is obtained N,N-dimethyl - p - (β - cyano-β-ethoxycarbonylvinyl)-m-methylphenylamine, M. P. 118–120° C. The light absorption spectrum of an ethanol solution of this compound shows a maximum absorption at 430 millimicrons with a molecular extinction coefficient of 40,500.

Part B

By the process of part B in Example I, N,N-dimethyl-p-(β-cyano-β-ethoxycarbonylvinyl)-m-methylphenylamine is converted to N,N-dimethyl-p-(α,β-dicyano-β-ethoxycarbonylvinyl)m-methylphenylamine, M. P. 39–49° C. The light absorption spectrum of an ethanol solution of this compound shows a maximum absorption at 499 millimicrons. This compound gives red dyeings on hydrophobic fibers.

*Analysis.*—Calculated for $C_{16}H_{17}N_3O_2$: C, 67.8%; H, 6.1%; N, 14.8%. Found: C, 65.7%; H, 6.1%; N, 14.9%.

EXAMPLE VII

Part A

β-Phenylethyl cyanoacetate is substituted for benzyl cyanoacetate in the procedure of part A of Example I and there is obtained N,N-dimethyl-p-[β-cyano-β-(β-phenylethoxycarbonyl)vinyl]phenylamine, M. P. 142–143° C. The light absorption spectrum of an acetone solution of this compound shows a maximum absorption at 420 millimicrons with a molecular extinction coefficient of 46,400.

Part B

By the process of part B of Example I, N,N-dimethyl-p-[β-cyano-β-(β - phenylethoxycarbonyl)vinyl] phenylamine is converted to N,N-dimethyl-p-[α,β-dicyano-β-(β-phenylethoxycarbonyl)vinyl]phenylamine, M. P. 135–136° C. after recrystallization from 1-propanol. The light absorption spectrum of an acetone solution of this compound shows a maximum absorption at 498 millimicrons with a molecular extinction coefficient of 31,000. Only 14% of this compound is destroyed when a suspension of it in water at pH 4 is refluxed for 23 hours. This compound gives bright red dyeings on hydrophobic fibers.

*Analysis.*—Calculated for $C_{21}H_{19}N_3O_2$: C, 73.0%; H, 5.6%. Found: C, 73.0%; H, 5.4%.

EXAMPLE VIII

Part A

Cyanomethyl 2-thienyl ketone is substituted for benzyl cyanoacetate in the procedure of part A of Example I and there is obtained N,N-dimethyl-p-[β-cyano-β-(2-thienylcarbonyl)vinyl]phenylamine, M. P. 171–172° C. The light absorption spectrum of an acetone solution of this compound shows a maximum absorption at 450 millimicrons with a molecular extinction coefficient of 42,600.

Part B

By the process of part B in Example I, N,N-dimethyl-p-[β - cyano - β - (2 - thienylcarbonyl)vinyl]phenylamine is converted to N,N - dimethyl - p - [α,β - dicyano - β-(2 - thienylcarbonyl)vinyl]phenylamine. After recrystallization from ethanol this compound melts at 155–156° C. The light absorption spectrum of an acetone solution of this compound shows a maximum absorption at 500 millimicrons with a molecular extinction coefficient of 21,800. This compound gives purple dyeings on hydrophobic fibers.

*Analysis.*—Calculated for $C_{17}H_{13}N_3OS$: C, 66.4%; H, 4.3%. Found: C, 66.3%; H, 4.3%.

EXAMPLE IX

Part A

Barbituric acid is substituted for benzyl cyanoacetate in the procedure of part A of Example I and there is obtained 5 - (p - dimethylaminobenzylidene)barbituric acid, M. P. 262–263° C. The light absorption spectrum of an acetone solution of this compound shows a maximum absorption at 454 millimicrons with a molecular extinction coefficient of 50,200.

Part B

By the process of part B in Example I, 5-(p-dimethylaminobenzylidene)barbituric acid is converted to 5-(α-cyano-p-dimethylaminobenzylidene)barbituric acid. This dye does not separate when the reaction mixture is poured into ice and water, but the resulting solution has a deep blue color due to the presence of this dye. The light absorption spectrum of an acetone solution of this compound shows a maximum absorption at 568 millimicrons.

EXAMPLE X

Part A p - Methyl(β - cyanoethyl)aminobenzaldehyde is substituted for p-dimethylaminobenzaldehyde in the procedure of part A of Example I and there is obtained N-methyl-N-(β - cyanoethyl) - p - (β - benzyloxycarbonyl - β - cyanovinyl)phenylamine, M. P. 135–136° C. The light absorption spectrum of an acetone solution of this compound shows a maximum absorption at 412 millimicrons with a molecular extinction coefficient of 45,800.

Part B

By the process of part B in Example I, N-methyl-N-(β - cyanoethyl) - p - (β - benzyloxycarbonyl - β - cyanovinyl)phenylamine is converted to N-methyl-N-(β-cyanoethyl) - p - (β - benzyloxycarbonyl - α,β - dicyanovinyl)-phenylamine. This compound is isolated as a gum which gives red dyeings on hydrophobic fibers. The light absorption spectrum of an acetone solution of this compound shows a maximum absorption at 482 millimicrons with a molecular extinction coefficient of 21,100.

EXAMPLE XI

Part A 1,3-hydrindanedione is substituted for benzyl cyanoacetate in part A of Example I and there is obtained 2-(p-dimethylaminobenzylidene) - 1,3 - hydrindanedione, M. P. 195–196° C. The light absorption spectrum of an acetone solution of this compound shows a maximum absorption at 477 millimicrons with a molecular extinction coefficient of 33,800.

Part B

By the process of part B in Example I, 2-(p-dimethylaminobenzylidene)-1,3-hydrindanedione is converted to 2 - (α - cyano - p - dimethylaminobenzylidene) - 1,3-hydrindanedione. When recrystallized from butanol, this compound melts at 173–176° C. The light absorption spectrum of an acetone solution of this compound shows a maximum absorption at 559 millimicrons with a molecular extinction coefficient of 32,900. This compound gives purple dyeings on hydrophobic fibers and on cellulose acetate. The half life of this compound in water at pH 4 and 100° is nine hours.

*Analysis.*—Calculated for $C_{19}H_{14}N_2O_2$: C, 75.5%; H, 4.7%; N, 9.3%. Found: C, 74.6%; H, 4.8%; N, 9.0%.

When 1,3-cyclopentanedione is used in place of 1,3-hydrindanedione in part A of this example, the final product is 2-(α-cyano-p-dimethylaminobenzylidene)-1,3-cyclopentanedione.

EXAMPLE XII

Part A

1 - phenyl - 3 - (2 - thienyl) - 5 - pyrazolone is substituted for benzyl cyanoacetate in the procedure of part A of Example I and there is obtained 4-(p-dimethylaminobenzylidene) - 1 - phenyl - 3 - (2 - thienyl) - 5 - pyrazolone, M. P. 175–176° C. The light absorption spectrum of an acetone solution of this compound shows a maximum absorption at 459 millimicrons with a molecular extinction coefficient of 46,600.

Part B

By the process of part B in Example I, 4-(p-dimethylaminobenzylidine) - 1 - phenyl - 3 - (2 - thienyl) - 5-pyrazolone is converted to 4-(α-cyano-p-dimethylaminobenzylidene - 1 - phenyl - 3 - (2 - thienyl) - 5 - pyrazolone. Without recrystallization this compound melts at 131–134° C. The light absorption spectrum of an acetone solution of this compound shows a maximum absorption at 552 millimicrons. This compound gives purple dyeings on hydrophobic fibers. Its half life in boiling water at pH 4 is 8.5 hours.

*Analysis.*—Calculated for $C_{23}H_{18}N_4OS$: C, 69.3%; H, 4.6%; N, 14.1%. Found: C, 71.4%; H, 4.8%; N, 13.7%.

EXAMPLE XIII

Part A

Benzoylacetonitrile is substituted for benzyl cyanoacetate and p-methyl(β-cyanoethyl)aminobenzaldehyde is substituted for p-dimethylaminobenzaldehyde in the procedure of part A of Example I, and there is obtained N-methyl - N - (β - cyanoethyl) - p - (β - benzoyl - β - cyanovinyl)phenylamine, M. P. 118–119° C. The light absorption spectrum of an acetone solution of this compound shows a maximum absorption at 423 millimicrons with a molecular extinction coefficient of 31,800.

Part B

By the process of part B in Example I, N-methyl-N-(β-cyanoethyl)-p-(β-benzoyl-β-cyanovinyl)phenylamine is converted to N - methyl - N - (β - cyanoethyl) - p - (β-benzoyl - α,β - dicyanovinyl)phenylamine. The light absorption spectrum of an acetone solution of this compound shows a maximum absorption at 477 millimicrons with a molecular extinction coefficient of 21,100. This compound is isolated as a gum that gives red dyeings on hydrophobic fibers.

*Analysis.*—Calculated for $C_{21}H_{16}N_4O$: C, 74.1%; H, 4.7%; N, 16.5%. Found: C, 72.5%; H, 4.8%; N, 14.8%.

EXAMPLE XIV

Part A p-Bis(β-cyanoethyl)aminobenzaldehyde is substituted for p-dimethylaminobenzaldehyde in the procedure of part A of Example I and there is obtained N,N-bis(β-cyanoethyl) - p - (β - benzyloxycarbonyl - β - cyanovinyl)phenylamine, M. P. 168–169° C. The light absorption spectrum of an acetone solution of this compound shows a maximum absorption at 402 millimicrons with a molecular extinction coefficient of 43,500.

Part B

By the process of part B in Example I, N,N-bis(β-cyanoethyl) - p - (β - benzyloxycarbonyl-β-cyanovinyl)-phenylamine is converted to N,N - bis(β - cyanoethyl) - p - (β - benzyloxycarbonyl - α,β - dicyanovinyl)-phenylamine. With recrystallization this compound melts at 45–55° C. The light absorption spectrum of an acetone solution of this compound shows a maximum absorption at 468 millimicrons. This compound gives red-orange dyeings on hydrophobic fibers.

*Analysis.*—Calculated for $C_{24}H_{19}N_5O_2$: C, 70.4%; H, 4.7%; N, 17.1%. Found: C, 69.5; H, 5.0%; N, 16.6%.

In another embodiment of the present invention, the p-dimethylaminobenzylidene compounds of Brooker et al. [J. Am. Chem. Soc. 73, 5332 (1951)] are converted by the process of part B of Example I to the corresponding α - cyano - p - dimethylaminobenzylidene compounds. Thus, hydrogen cyanide is added to 3-(p-dimethylaminobenzylidene)-1-ethyloxindole and the resulting compound is oxidized to yield 3-(α-cyano-p-dimethylaminobenzylidene)-1-ethyloxindole. Similarly, hydrogen cyanide is added to 4 - (p - dimethylaminobenzylidene) - 3 - phenyl - 5(4H) - isoxazolone and 5 - (p - dimethylaminobenzylidene) - 1,3 - diethyl - 2 - thiobarbituric acid which upon subsequent oxidation yield 4-(α-cyano-p-dimethylaminobenzylidene) - 3 - phenyl - 5(4H) - isoxazolone and 5-(α-cyano-p-dimethylaminobenzylidene)-1,3-diethyl-2-thiobarbituric acid, respectively.

The (α-cyano-β-substituted vinyl aromatic) amines of the present invention have the amino group separated from the vinyl group by an even number, from two to four, of annular carbons and have the formula

QArC(CN)=CXY where X may be COOR, COZ, COR, R being alkyl, aryl and substituted aryl, Y may be CN, COOR, COZ, COR, R being alkyl, aryl and substituted aryl, Q is amino including mono- and disubstituted amino, Z is amido, including mono- and disubstituted amido, and Ar is an aromatic hydrocarbon diradical, i. e., phenylene, naphthylene, and anthrylene.

Of the compounds indicated by the above formula, those are preferred in which X and Y are bonded through a carbon atom carrying a plural bond as in CN, COOR, and COZ. These substituents are hydrolyzable to carboxyl.

The first step of the present invention is carried out by bringing the selected β-substituted vinyl aromatic amine in contact with hydrogen cyanide in a basic medium, e. g., a solution of a cyanide of an alkali metal (sodium cyanide, potassium cyanide, etc.) in an aqueous medium which may also contain water-miscible organic solvents, such as alcohols, ketones or formamides. This reaction takes place spontaneously at room temperature, but, for convenience in bringing the reaction to completion in a short time, the reaction mixture may be heated at temperatures up to 100° C. Isolation and/or purification of the β-substituted ethyl aromatic amine which is formed before proceeding with the next step of the process is optional.

In the second step of the process of the present invention, the β-substituted ethyl aromatic amine is subjected to oxidative dehydrogenation by the action of an oxidizing agent, e. g., air, oxygen, calcium hypochlorite, bromine, chloranil, N-bromosuccinimide, benzoyl peroxide, dilute (e. g., 1 N) nitric acid, lead tetraacetate, or red lead oxide. This step of the reaction is suitably carried out in the presence of an acidic medium. The reaction takes place spontaneously at room temperature. Care must be exercised not to prolong the action of the oxidizing agent unduly after the desired α-cyano-β-substituted vinyl aromatic amine has been formed lest some of this product be consumed by further oxidation. Furthermore, it is desirable to use not much more than 10% more than a stoichiometric amount of the oxidizing agent.

To minimize loss by decomposition of reactants and products it is further preferred that the reaction mixture in which the oxidative dehydrogenation takes place be such that, on diluting one volume of said mixture with nine volumes of water there is obtained a mixture in which the hydrogen ion concentration is not less than $10^{-12}$ molar and not more than 1 molar.

The compounds of the present invention are useful as dyes, particularly for hydrophobic fibers, e. g., "Dacron" polyester fiber, "Orlon" polyacrylonitrile fiber, etc. In such dyeing it is preferred to carry out the dyeing step in a mildly acidic aqueous medium. For example, a solution of 1.5 parts of 2-(α-cyano-p-dimethylaminobenzylidene)-1,3-hydrindanedione (Example XI) and 1.5 parts of "Marasperse CB" (a sulfonated lignin detergent) in 500 parts of ethylene glycol monomethyl ether is added with stirring to 4,000 parts of boiling water previously adjusted to pH 4 by addition of acetic acid. To the resultant dye suspension is added 100 parts of "Dacron" polyester yarn. The suspension is boiled one hour, after which the yarn, now dyed a handsome violet color, is withdrawn, washed well with water, and dried. In dyeing "Dacron" polyester fibers it is frequently advisable to employ a carrier such as benzoic acid or o-phenylphenol. Thus, one part of the 2-(α-cyano-p-dimethylaminobenzylidene)-1,3-hydrindanedione of Example XI is dissolved in 100 parts of ethylene glycol monomethyl ether and the solution is poured into 1000 parts of warm water containing 20 parts of the condensation product of formaldehyde and beta-naphthalenesulfonic acid. In a second container is dissolved 100 parts of benzoic acid in 5000 parts of boiling water. After cooling to 180° F. the dye solution is added and 100 parts of "Dacron" polyester fiber is entered. The material is dyed at 180° F. for 15 minutes and then boiled one hour. The dyed material is removed from the bath, rinsed with water and then treated for 30 minutes at the boil in a solution containing 2% technical sodium dodecylsulfate and 0.05% sodium hydroxide. The deep violet dyed fiber is withdrawn, rinsed with water and dried. The same procedure results in successful dyeings with the other dyes of the present invention, particularly the dyes of Examples I to VI, VII, VIII, X–XII, and XIV.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. An aromatic amine represented by the formula

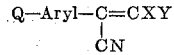

wherein Q is a disubstituted amino group separated from the vinyl group by an even number, from two to four, of annular carbons of the aryl group, the N-substituents in Q are selected from the group consisting of lower alkyl and lower cyanoalkyl, X is a substituent, bonded to the vinyl group by a carbon of the substituent which is doubly bonded to oxygen, selected from the group consisting of lower alkoxycarbonyl and aralkoxycarbonyl, carbamyl, lower alkylcarbonyl, and arylcarbonyl, and Y is a substituent selected from the group consisting of lower alkoxycarbonyl and cyano.

2. N,N - dialkyl - p - (α,β - dicyano - β - alkoxycarbonylvinyl)phenylamine, wherein said alkyl groups are lower alkyl and said alkoxy group is lower alkoxy.

3. N,N - dimethyl - p - (α,β - dicyano - β - methoxycarbonylvinyl)phenylamine.

4. The process which comprises hydrocyanating, with an aqueous solution of a cyanide of an alkali metal, an aromatic amine represented by the formula

wherein Q is a disubstituted amino group separated from the vinyl group by an even number, from two to four, of annular carbons of the aryl group, the N-substituents in Q are selected from the group consisting of lower alkyl and lower cyanoalkyl, X is a substituent, bonded to the vinyl group by a carbon of the substituent which is doubly bonded to oxygen, selected from the group consisting of lower alkoxycarbonyl and aralkoxycarbonyl, carbamyl, lower alkylcarbonyl, and arylcarbonyl, and Y is a substituent selected from the group consisting of lower alkoxycarbonyl and cyano to form the corresponding α-cyanoethyl-substituted aromatic amine and then dehydrogenating said α-cyanoethyl product with an oxidizing agent in an acid medium to form the compound represented by the formula

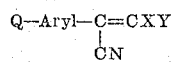

5. The process which comprises mixing an aqueous solution of a cyanide of an alkali metal with an N,N-dialkyl - p - (β - cyano - β - alkoxycarbonylvinyl) - phenylamine carrying hydrogen on the alpha carbon of the vinyl group, wherein said alkyl groups are lower alkyl and said alkoxy group is lower alkoxy, to form an N,N-dialkyl-p-(α,β-dicyano-β-alkoxycarbonylethyl)-phenylamine, and then mixing said product with an oxidizing agent in an acid medium to form an N,N-dialkyl-p-(α,β-dicyano-β-alkoxycarbonylvinyl)phenylamine, wherein said alkyl groups are lower alkyl and said alkoxy group is lower alkoxy.

References Cited in the file of this patent

UNITED STATES PATENTS

| | | |
|---|---|---|
| 2,206,108 | Muller et al. | July 2, 1940 |
| 2,307,700 | Moore | Jan. 5, 1943 |
| 2,538,008 | Keyes et al. | Jan. 16, 1951 |
| 2,554,484 | Loder | May 29, 1951 |
| 2,666,780 | Arthur et al. | Jan. 19, 1954 |
| 2,701,260 | Hagemeyer | Feb. 1, 1955 |

OTHER REFERENCES

Cook et al.: C. A. Col. 6237 (1937).